W. D. DOREMUS.
CHECK PROTECTOR.
APPLICATION FILED JAN. 22, 1915.

1,148,831.

Patented Aug. 3, 1915.
6 SHEETS—SHEET 1.

Witnesses:

Inventor:
Willard D. Doremus,
By W. J. Duvall,
Attorney.

W. D. DOREMUS.
CHECK PROTECTOR.
APPLICATION FILED JAN. 22, 1915.

1,148,831.

Patented Aug. 3, 1915.
6 SHEETS—SHEET 5.

Witnesses:

Inventor:
Willard D. Doremus,
By W. C. Duvall,
Attorney.

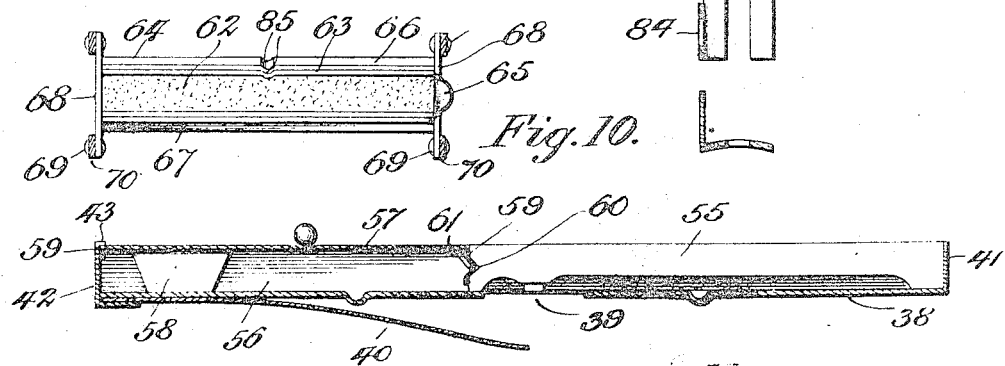

UNITED STATES PATENT OFFICE.

WILLARD D. DOREMUS, OF WASHINGTON, DISTRICT OF COLUMBIA, ASSIGNOR TO THE EXACTOGRAPH COMPANY, OF WASHINGTON, DISTRICT OF COLUMBIA, A CORPORATION OF DELAWARE.

CHECK-PROTECTOR.

1,148,831.      Specification of Letters Patent.      Patented Aug. 3, 1915.

Application filed January 22, 1915. Serial No. 3,723.

*To all whom it may concern:*

Be it known that I, WILLARD D. DOREMUS, a citizen of the United States, residing at Washington, in the District of Columbia, have invented a new and useful Check-Protector, of which the following is a specification.

My invention relates to what are generally termed "check protectors."

The objects in view are to simplify the construction and reduce the number of parts, thereby to produce a most compact device for the purposes intended and to greatly reduce the cost of manufacture, the latter object being furthered by the fact that the component parts are capable of being produced, fitted, and assembled without expensive machine or hand-work; to so construct the machine as to adapt it for a multiplicity of other useful purposes closely related to the protecting of checks, drafts, &c., such as for use in post-offices and express-offices in protecting money and express-orders, whereby the exact amounts for which the same are issued may be legibly and permanently impressed thereon across their faces and in such manner as will defy alteration, and not only this, but capable of a ready variation as regards the characters and names of the amounts so impressed, as dollars, pence, pounds, shillings, &c., whereby the invention is adapted for use in foreign exchanges, foreign countries, &c.; and furthermore, to also adapt the machine to serve as a convenient and successful numbering-machine for either successively or in any number numbering checks, &c., all of which, together with other objects and advantages of the invention will appear in the following description and be more particularly pointed out in the claims.

Figure 1:
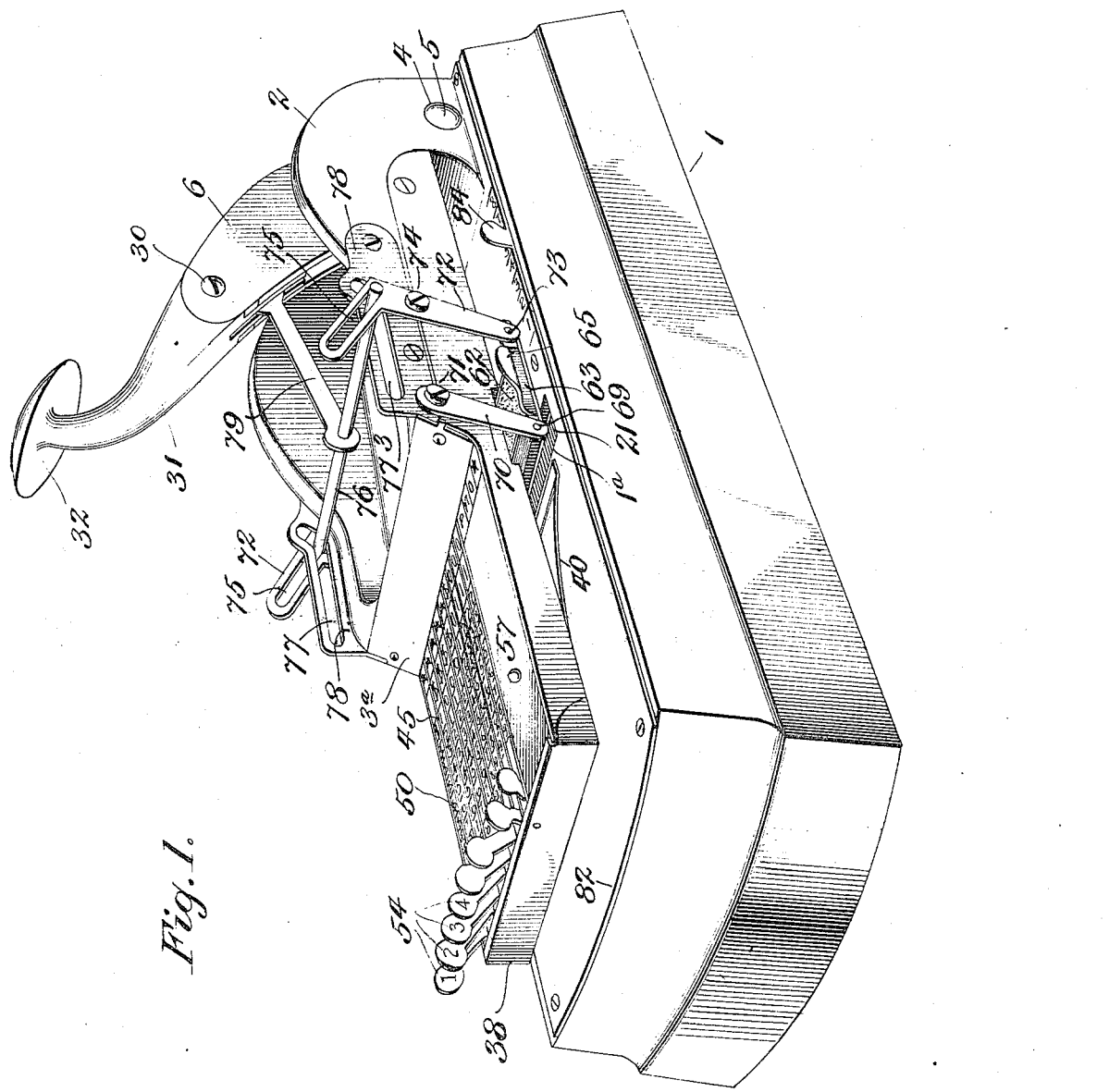
Figure 2:
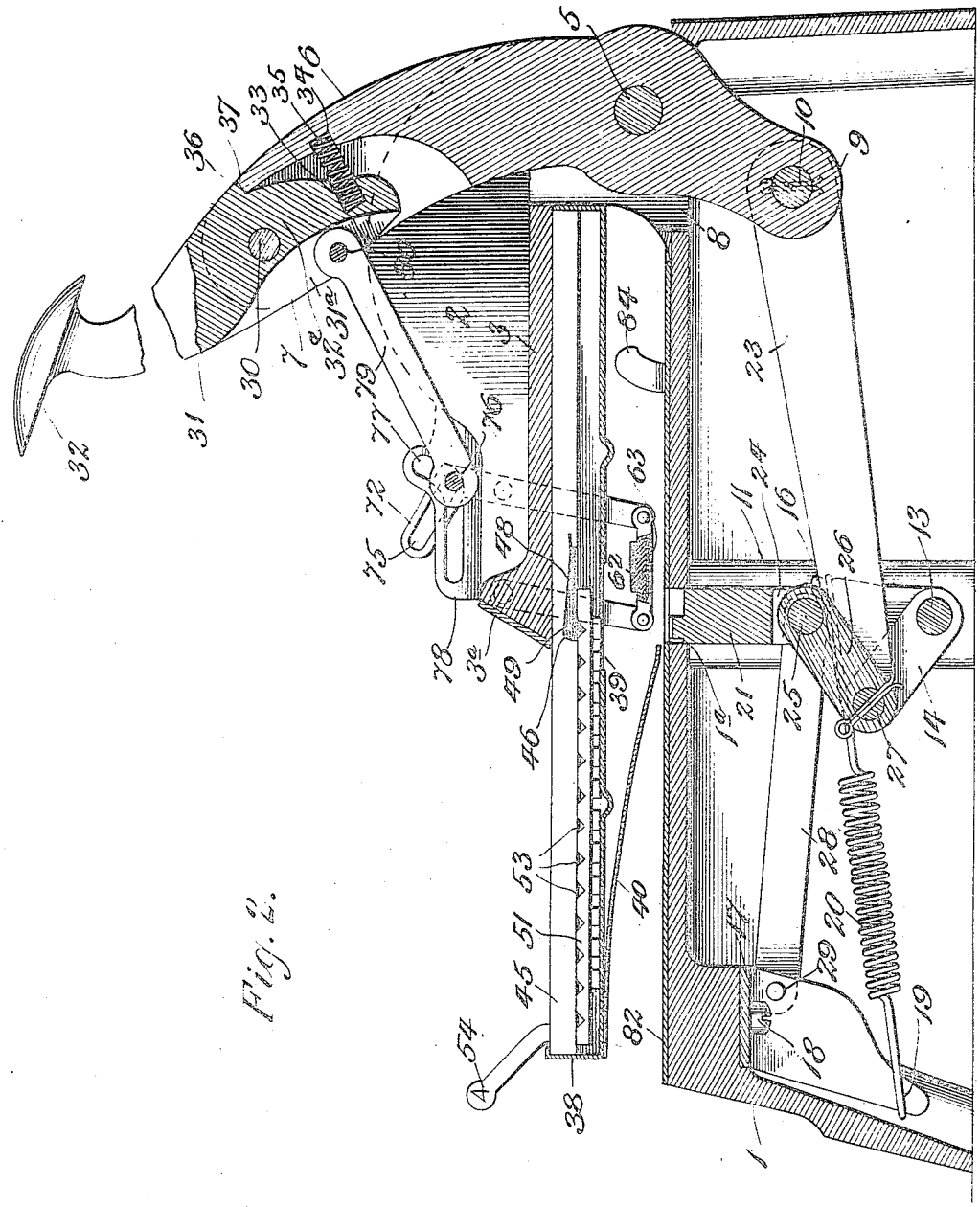
Figure 3:
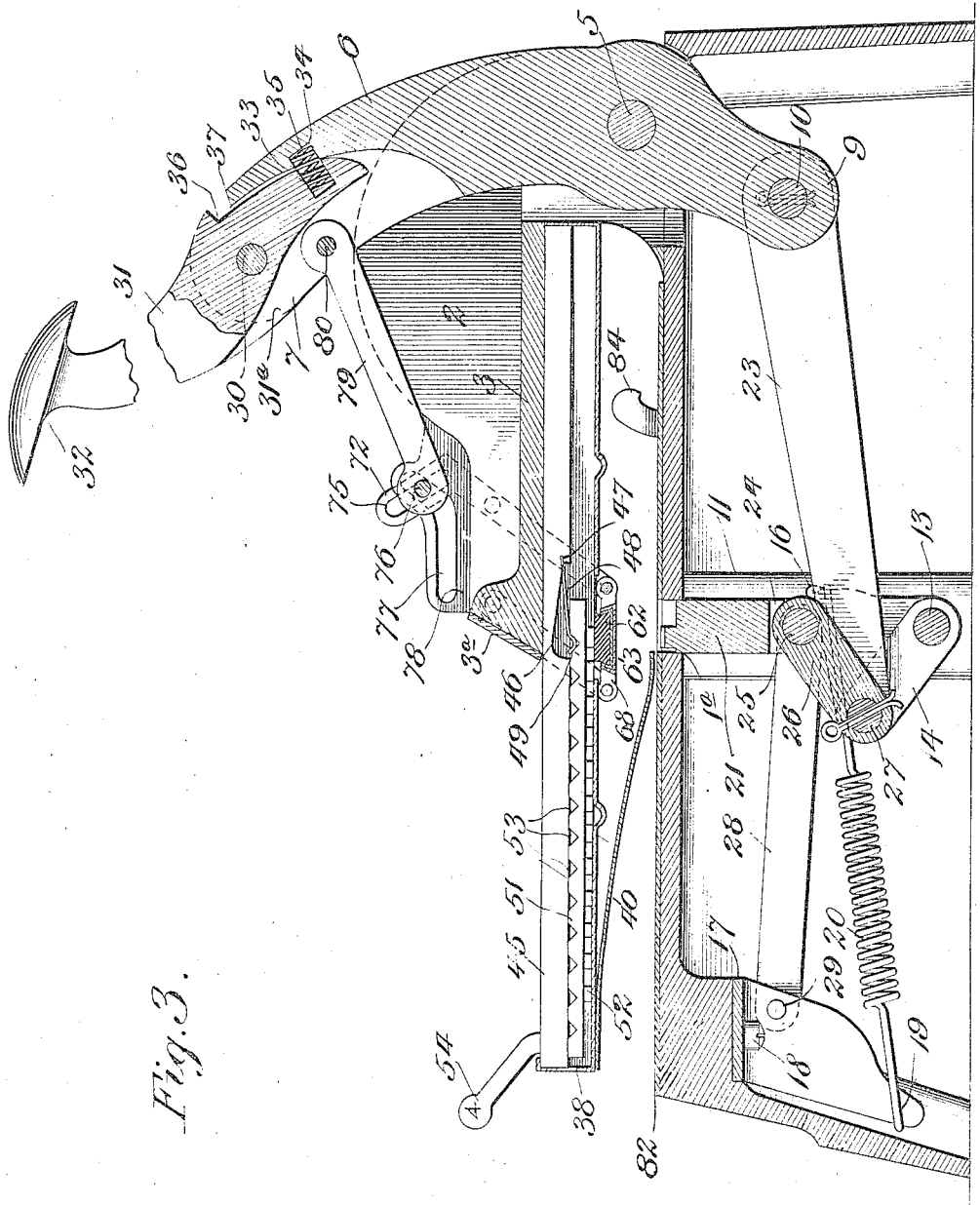
Figure 4:
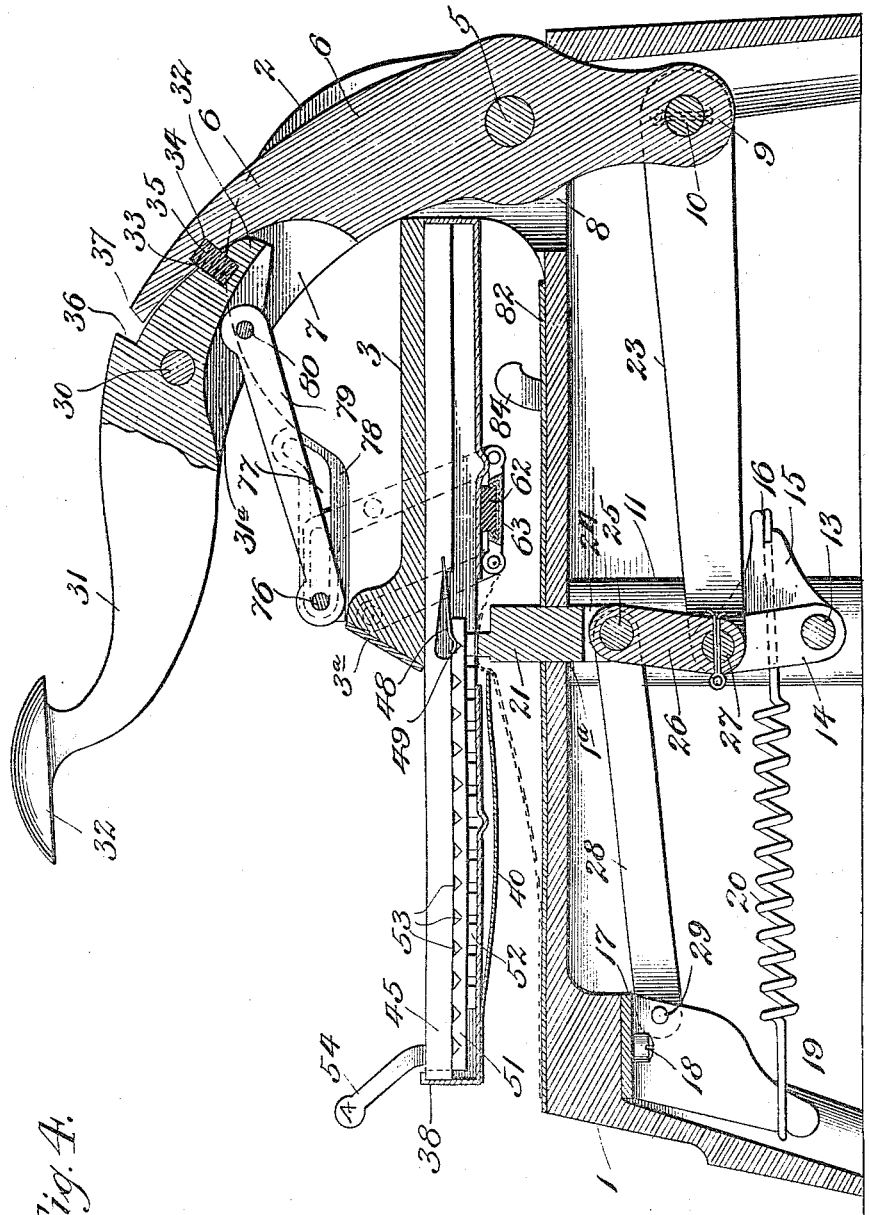
Figure 5:
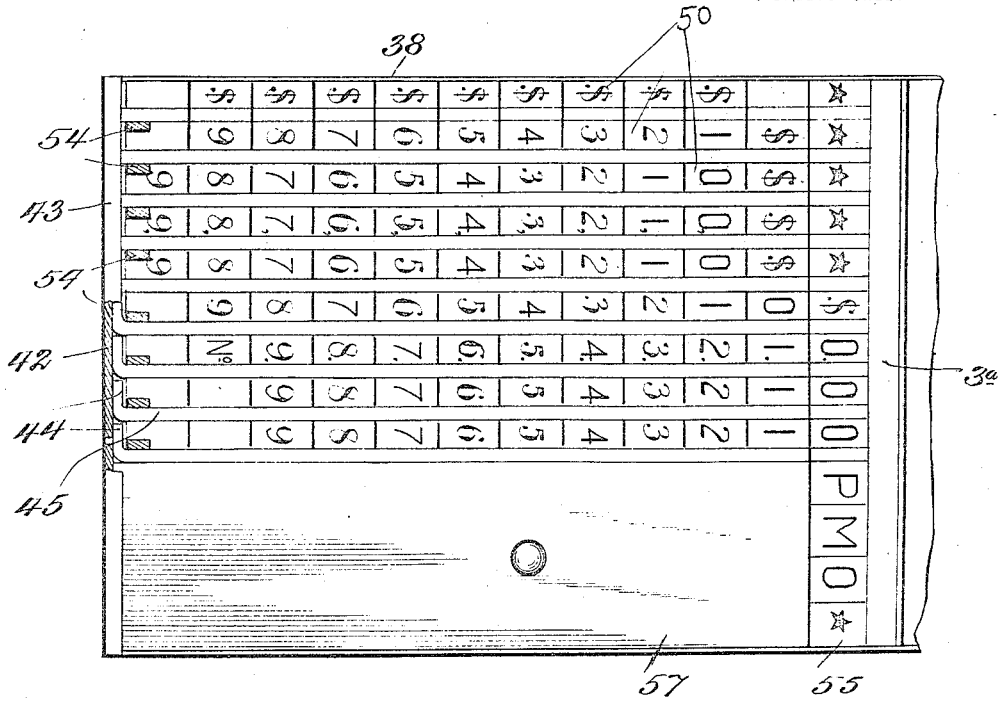
Figure 6:
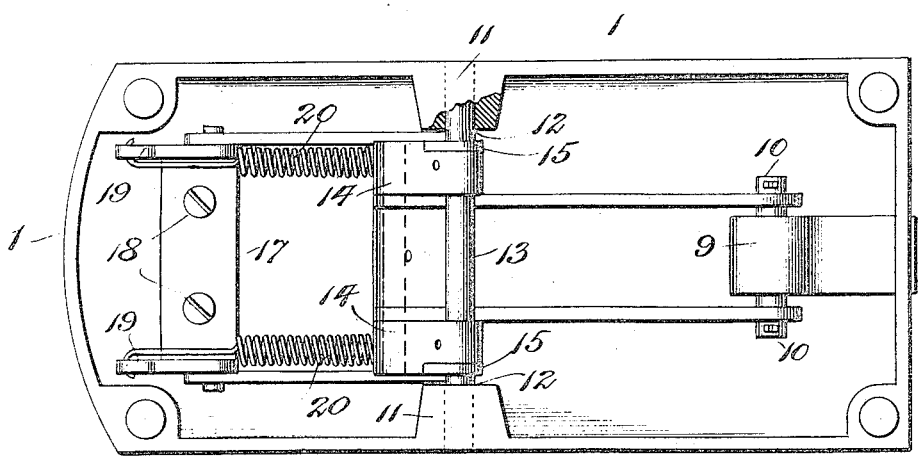

Referring to the drawings—Figure 1 is a general or perspective view, taken from the front and side, of a check protector embodying my improvements. Fig. 2 is a central vertical longitudinally disposed section of the protector, the parts being shown in their normal or inoperative position. Fig. 3 is a similar view of the protector, the parts being shown in the position they occupy after the first initial pressure is given the operating lever and wherein the machine is in the act of inking. Fig. 4 is a similar view of the protector, the parts being shown in the position they occupy when the operating lever has been wholly depressed and the impression made. Fig. 5 is a plan view, with parts broken away, of what might be conveniently termed, the key-board. Fig. 6 is a bottom plan view of the protector showing the underside of the base of the same. Figs. 7, 8, 9, 10, 11, 12, 13 and 14, are details of parts hereinafter referred to.

Corresponding numerals of reference indicate or correspond with similar parts throughout the several sheets and figures of the drawing.

In practising my invention, I employ a hollow cast-metal base 1, in the upper side of which and which constitutes the bed of the machine, there is formed a transverse slot or opening 1$^a$. Rising from the rear wall of the hollow base, and projecting forwardly and above the bed to a point about vertically opposite the slot 1$^a$ thereof, is a pair of curved standards 2, that are connected by an intermediate horizontal web 3, having an inclined front edge 3$^a$. These standards are formed with transversely opposite bearing-openings 4, in which is seated a transverse journal-pin 5, and mounted upon this pin and extending both above and below the bed-plate, and, therefore, at its lower end into the hollow base, is a vibratory operating-lever 6. The upper end of this lever is slotted or bifurcated, as at 7, for a purpose hereinafter specified, and the lower end, after passing through an opening 8 in the base, terminates in a transversely bored hub 9, from which extends at either side the end of a journal-pin 10.

The opposite side-walls of the hollow base 1 have formed integral with their inner surfaces thickened portions or ribs 11, which, near their lower ends, have formed therein transversely opposite openings 12, for the accommodation of a transverse shaft 13, mounted to rock or vibrate upon which, and spaced a short distance from the walls of the hollow-base, is a pair of spaced-apart short rock-arms 14, that are forwardly and upwardly disposed. From the outer sides of the said rock-arms and designed to move therewith, project a pair of upwardly disposed bell-crank levers 15, at the free ends of which are formed hooks 16. An inverted U-shaped bridge-piece 17, may be bolted, as at 18, to the underside of the bed-plate of the base, and the depending terminals 19 of such bridge-piece are connected to the hooks 16 of the bell-crank levers by a pair of helical retracting-springs 20.

The rock-arms 14, heretofore mentioned, are provided at their upper free ends with bearing-openings which receive the ends of a transverse journal-pin 27. Loosely connected to this journal, between the rock-arms 14, are the forward ends of a pair of longitudinally and rearwardly disposed links 23, the rear ends of which are similarly connected to the ends of the journal-pin 10 of the lever 6, whereby movement is transmitted from the latter lever to the rock-arms, all as will hereinafter appear.

Mounted for vertical movement within the opening 1ª of the bedplate of the base, is the platen 21, the upper face of which is preferably serrated, roughened or finely toothed, as best shown in Fig. 8. At its lower end the platen is cutaway at its center to form opposite depending lugs 24, the latter being transversely bored to receive a transverse journal-pin 25. A link-block 26, is transversely bored at its upper end to receive the pin 25 and fits neatly between the lugs 24 depending from the platen. The lower end of this link-block is similarly bored to receive a lower transverse journal-pin 27, to which it may be pinned, and which also connects the upper ends of the upwardly disposed bell-crank levers 14. A pair of forwardly disposed links 28, have their rear ends loosely connected to the ends of the pin 25 and their front ends similarly connected to the depending ends of the bridge-piece by means of pins 29. From this it will be seen that the platen is carried at the upper end of a toggle-system, composed of the link-block 26, and the arms 14; and that when the operating-lever 6 is not influenced by pressure, the toggle-system is in the position shown in Fig. 2, being yieldingly held by the tension of the two retracting-springs 20; but that when the hand-lever is pressed downward, as shown in Fig. 4, the toggle-system assumes the extended position, whereby the platen is elevated for the purpose of aiding in the taking of the impression, such operation being in opposition to the tension of the springs 20, which, as will be apparent, serve to return the parts to normal or inoperative position the moment the operating-lever is relieved of pressure.

Pivoted, as at 30, between the bifurcations 7 of the operating-lever 6, is a secondary lever 31, adapted to receive pressure of the hand of the operator. for which purpose it is fashioned with the knob 32 or some other convenient shape. This secondary lever is provided with a rear reduced end 32ª, fitting within the bifurcation or recess 7 of the lever 6, and in the upper side of said reduced portion there may be formed a small cavity 33, registering with a similar cavity 34 formed in the lever 6. Within these cavities are the ends of an expansion spring 35, which serves to normally elevate the outer or free end of the secondary lever for a purpose hereinafter apparent. Shoulders 36, are formed on the rear upper side of the secondary lever 31, and these contacting with similar shoulders 37 formed on the lever 6, serve to limit the rearward movement of the secondary lever with relation to the lever 6.

Supported by and between the forwardly disposed standards 2, as, for example, by ordinary screws, is a rectangular type-box or tray 38, the front of which terminates near the front end of the base 1. This type-box or tray is formed of light sheet-metal, and is provided in its underside or bottom with a transverse opening 39, being vertically above the opening 1ª in the bedplate and the vertically movable platen 21. A spring-like apron 40, may be secured to the underside and at the front end of the type-box or tray and extend rearward and downward, terminating immediately in advance of the opening 1ª of the bedplate. At its rear, the type-box or tray is provided with a vertical abutting-wall 41, and at its front with a corresponding abutting-wall 42, the latter wall preferably having its upper edge turned backwardly at a right angle to form a narrow locking-flange 43, (see Fig. 5) for engaging the laterally bent ends 44, of a series of holding and spacing-bars 45. The latter are merely narrow metallic bars arranged at intervals within the type-box or tray, their rear ends abutting against the abutting-wall 41 of the same and their front laterally bent or angular ends engaged by the narrow locking-flange 43 thereof, heretofore mentioned. They are prevented from vertical movement by the web 3 located between the standards, said flange, as will be apparent, forming the upper side or cover of the type-box or tray.

The underside of each of the holding and spacing-bars is recessed, as at 46, (see Figs. 2, 3 and 4), and let into a kerf 47, in the rear wall of the recess and extending forwardly in the recesses aforesaid is a light spring detent 48, the front or free end of which is provided with a rounded nib 49.

Between each pair of holding and spacing-bars 45, is located a sliding type-bar 50 (for detail of which see Fig. 12). The type-bar 50 is approximately one-half the length of the type-box or tray, and is adapted to reciprocate longitudinally between the front and rear walls thereof, being confined during such reciprocations by the aforesaid holding and spacing-bars 45. At the side of each of the type-bars and near the bottom edge thereof, is a longitudinally disposed rib 51, and upon such ribs rest the holding and spacing-bars 45. The undersides of the type-bars are provided with preferably serrated type 52, and the upper sides of the ribs 51 are provided with shallow notches 53—one for each type—designed to be successively engaged by the nibs 49, of the spring-detents 48, whereby the type-bars may be temporarily held with any one of their type immediately above the platen 21. Each type-bar is further provided with an upwardly disposed operating ear or handle 54, which may be conveniently grasped by the operator for the purpose of moving the bar in either direction. It will be seen that the bars 45 not only hold the type-bars yieldingly in any of their adjusted positions so that their type are properly presented to the printing point, but being locked themselves against upward withdrawal from the type-box or tray, and overlapping the ribs of the bars, the type-bars are themselves thus locked positively against upward withdrawal. The upper faces of the type-bars, of course, carry numerals, letters, or characters corresponding to the type on the underside of the type-bar and preferably one step in advance thereof, whereby, when a type-bar is moved so that a certain character is at the top of the line of printing, the character represented thereby and corresponding thereto is immediately at the printing point or above the platen 21. This, in the present instance, necessitates the type thus indicated to be one step in rear of the one designated on the upper surface of the type-bar.

Of course, it will be understood, that the characters on the type-bars may be varied at will, those illustrated being merely for example. In the present instance, the third type-bar from the right, in addition to the numerals from 0 to 9, also carries a decimal point after each numeral. So, also, does the sixth type-bar from the right carry after each numeral, a comma. In this manner the sum printed is properly pointed off. The last type-bar from the right may carry nothing but the ordinary dollar mark, and such marks are also carried by each of the type-bars beginning with the third, so that it is possible, in the present example, to print from one cent to nine hundred and ninety nine thousand, nine hundred and ninety nine dollars and ninety nine cents. The spaces not occupied otherwise by useful characters may be occupied with stars simply to fill in and make a neat appearance both in the machine and on the check. As will be evident, the machine may be readily adapted for indicating foreign denominations by substituting for the type-bar at the left a similar bar having such denominations both in character and type; or, if the character be too large for the space of one bar, a plurality of bars and holding bars may be removed and a single bar of the combined width of those removed substituted. In this manner the machine may be utilized for foreign exchange business or by any foreign country. I may, also, as in the present instance, form the type-box or tray sufficiently wide to accommodate four short extra type-bars, 55 (a detail of which is illustrated in Fig. 11). These type-bars, being shorter than their companions, leave an unoccupied space 56, which I propose to suitably cover and utilize for the storage of extra ink-pads hereinafter mentioned. These bars 55 may be utilized in any way desired, but in the present instance, being for use in a machine adapted for postal use, carry the letters "P. M. O." (indicating postal money order) the remaining bar merely carrying a star to fill in. If desired, these bars may carry the initials of the sender of the check where the machine is used by a private concern or party. The space 56 is, in the present instance, temporarily closed by a closure 57, the sides and ends of which are bent downward as at 58 and 59 respectively. The side flanges 58 enter between the first holding and spacing bar 45 and the opposite side of the type-box or tray, while the end-flanges 59 enter between the front wall of the type-box or tray and the front ends of the short type-bars 55. The front ends of these bars may be provided with shallow transverse indentations 60 to removably engage with corresponding ribs 61 formed in the rear end-flange of the closure. In this manner, the type-bars 55 being retained in position by the means heretofore described, the closure is, by means of said bars, likewise yieldingly held against displacement. The inclosed space thus formed in the type-box or tray will be found convenient in storing one or more extra inking-pads 62 (see Fig. 10).

The ink-pads are of the usual construction, being formed of felt or some other absorbent material and mounted upon a suitable base. They may contain either one or two colors, and in the latter instance, as will be obvious, will print the numerals in one color and the indicating characters in another. I prefer to mount the pad within a light metal tray 63, the same being of general oblong shape and having upturned ends and side so as to conveniently hold the pad which is preferably cemented therein. The opposite longitudinal sides of this tray may be inwardly inclined, as at 64, and one of the end-walls may be somewhat extended, as at 65, to form a finger-hold for aiding in its removal from the ink-pad carrier.

The ink-pad carrier 66, is of general oblong shape similar to and adapted to receive the ink-pad, and has its side-walls inclined so as to receive and engage the corresponding walls of the pad, as indicated at 67. The carrier is located under the type-box or tray and is adapted to swing backward and forward into and out of contact with the face of the line of type opposite the opening 39 in the bottom of the said box. Each end of the carrier is provided with a transverse arm 68, the front ends of these arms being loosely connected by pivots 69, with the lower ends of short front links 70, the upper ends of which are pivoted as at 71, to the opposite sides and at the front end of the web 3. The rear ends of the arms 68, are pivoted to the lower ends of a pair of bell-crank levers, 72, at 73, said levers being fulcrumed at 74, on the sides of the standards 2. The upper angular ends of these bell-crank levers are slotted, as at 75, and loosely receive the extremities of a transverse rod 76 which serves to operate said bell-cranks. Between its ends this rod is mounted for movement in an angular guide slot 77, formed in a pair of guide-plates 78, secured to the outer sides of the standards 2. An arm 79, is connected at its front end to the rod 76, and at its rear end pivotally connected, as at 80, within a recess 31ª of the secondary lever 31.

Referring more particularly to Figs. 1, 7 and 9, it will be seen that the top of the bedplate, at each side, is provided with a shallow slot 81, and that the covering-plate 82, of the bedplate extends to very near the outer edge of the slot. Within each of these slots and adapted to move back and forth, is a gage-plate 83, which is merely a narrow plate of light metal, slightly curved transversely, so as to have frictional contact with the bedplate and its cover, and provided with an upturned indicator 84, at its outer side. A scale (see Fig. 1) is provided at each side of the cover-plate 82, whereby to gage the positions of the gage-plates, the latter, therefore being capable of being positioned directly opposite each other or at an angle, as desired, for forming a stop for the check or other paper inserted in the machine and thereagainst. In this manner the machine may be caused to print across the face of the check or other paper accurately on a longitudinal or transverse line or diagonally, it being understood that the two gage-plates are wholly independent in their actions.

Any desired means may be provided for retaining the inking-pad and its supporting base within the carrier, but I prefer to indent correspondingly the two side walls of the pad base and that of the carrier, whereby they may engage yieldingly together, as indicated at 85, (Fig. 8).

This completes the construction of the machine, the operation of which, though perhaps, readily understandable from the foregoing detail description, may be briefly stated to be as follows: Figs. 1 and 2 show the parts of the machine in their normal position, wherein, the secondary handle 31 is elevated by the spring 35, until the shoulders 36 and 37 abut. In this position, also, the arm 79 is thrust forward slightly so that the bell-crank levers 72 are swung rearward and downward, thus supporting the ink-pad and its carrier to the rear of and below the line of type exposed above the opening 39 in the type-box or tray. The gage-plates 84 are, of course, adjusted to the size of the check or other paper to be printed upon, and are held, when so adjusted, by the frictional engagement heretofore described. The operator first moves the type-bars, in a manner obvious, so as to bring the proper type to the printing-point—that is, above the opening 39 of the type-box or tray. The check or other paper to receive the impression is now inserted face upward under the apron 40, the latter exerting sufficient tension to retain the check in position. The operator next gives the lever 6 a downward movement, which pressure so exerted, causes the following operation: The secondary handle or lever 31 rocks forward on its pivot 30 and against the tension of the light spring 35. This causes the lower end of said handle or lever to travel backward, whereby the arm 79 likewise moving backward, the shaft 76 travels rearwardly and upwardly in the inclined slots 77 of the guide-plates 78. This operation serves to rock the bell-crank levers 72 on their fulcrums 74, the slots 75 of the bell-crank levers permitting of this movement. In this manner the upper ends of the bell-crank-levers are moved rearward and consequently the lower ends thereof are moved forward and upward, which serve to advance and elevate the ink-pad carrier and the ink-pad carried thereby. Thus the ink-pad is brought into contact with the face of those type at the printing point and a distribution of the ink occurs.

When the secondary lever has reached its lowest position the pressure of the hand of the operator is felt by the operating lever 6, which, in turn, rocks forward on its pivot 5. This lever, as heretofore described, serves to straighten out the toggle mechanism within the base and elevate the platen so as to press the check or other paper located thereover up and against the type that are exposed immediately above the opening 39 in the type-box or tray. The pressure thus exerted causes the type and the platen together to permanently cut and print the amount indicated by the type-bars on the check or other paper so submitted to the operation of the machine. Previous, however, to the making of the impression as above described, it becomes necessary to withdraw the ink-pad and its supporting carrier from the line of type and the path of the upwardly moving platen. As the lever 6 moves forward at its upper end and before the platen is thereby elevated any appreciable distance, the arm 79, carried by the lever 31, is moved forward, being guided by the lower or horizontal portions of the slots 77 formed in the two guide-plates 78. This movement causes the upper ends of the slotted bell-crank levers to move forward and the lower ends thereof to move backward, thus moving the ink-pad carrier downward and rearward out of the path of the by this time upwardly moving platen where it is held during the making of the impression. As soon as released, the springs 20 and 35 return the levers to the positions shown in Fig. 2, wherein it will be seen that 20 and 35 return the levers to the positions below and slightly to the rear of the exposed line of type, or, in other words, the printing-point.

It will be observed that as the levers 15 move to the rear, the springs 20 approach the journal 13, so that the leverage on the springs is least when the parts are in the position shown in Fig. 4; that is, when the machine is in the act of printing. The pressure, therefore, exerted at this time, is, for the most part, employed in making the impression instead of being utilized in overcoming the tension of the springs 20, and may be comparatively light.

It will be obvious that by a simple manipulation of the type-bars, the machine may be conveniently and successfully employed as a numbering machine, such numbers being made to appear in duplicate or singly as desired.

It will be noted that although the springs 20 are termed "return-springs," and actually perform the function of such, yet, they perform a novel additional function, and one of very great importance to the successful working of the machine; that is to say, the degree of pressure of the inking-pad against the type is regulated by the strength or "pull" of said springs. This is readily observable by following the movement of the lever 31. As heretofore stated, the initial pressure exerted by the hand of the operator on the lever 31 depresses said lever whereby to swing the inking-pad forward and upward against the type. During this initial operation it is necessary that the operating-lever 6 remain stationary or immovable, for that it serves merely as the fulcrum of the lever 31. The extent to which this lever 6 will remain immovable, or in other words, the amount of force exerted by the operator's hand it will resist, and therefore the degree of pressure of the inking-pad against the type, all depends upon the strength or "pull" of the springs 20. The latter springs, therefore, as before stated, regulate the pressure of the inking-pad against the type.

Having described my invention, what I claim, is:

1. In a machine of the class described, the combination with a type-bar supporting box or tray having an opening in its underside, of a plurality of type-bars arranged side by side and adapted to reciprocate in said box or tray, whereby to bring their type successively opposite the opening in the box or tray, a plurality of loose spacing-bars also arranged in and independent of said box or tray and intermediate the type-bars, means for locking said spacing-bars, a vertically reciprocating platen arranged below the opening in the box or tray, and means for moving the platen into and out of contact with the type of the type-bars.

2. In a machine of the class described, the combination with a type-bar supporting box or tray having an opening in its underside, of a plurality of type-bars arranged side by side and adapted to reciprocate in said box or tray, each of said bars having at one side a longitudinally disposed lateral rib, a plurality of loose spacing bars also arranged in said box or tray independent thereof and intermediate the type-bars and engaging the ribs thereof, whereby to lock the same against vertical movement, means for locking the spacing-bars, a vertically reciprocating platen arranged below the opening in the box or tray, and means for moving the platen into and out of contact with the type of the type-bars.

3. In a machine of the class described, the combination with a type-box or tray having an opening in its under side, of a plurality of type-bars arranged side by side and adapted for independent reciprocation in said box or tray, each of said bars having at one side a laterally extended longitudinally disposed rib, a plurality of loose independent spacing-bars arranged in said box or tray between the type-bars and supported by the ribs of the latter, means for holding the spacing-bars within the box or tray, whereby to lock the type-bars in position, means for locking the ends of the spacing-bars against vertical movement, a vertically disposed platen below the opening in the box or tray, and means for bringing the platen and type-bars together to cause an impression.

4. In a machine of the class described, the combination with a type-bar supporting box or tray having an opening in its underside, of a plurality of type-bars arranged side by side and adapted to reciprocate in said box or tray, each of said bars having at one side a longitudinally disposed lateral rib having notches agreeing with the type carried by the type-bars, a plurality of spacing-bars arranged in said box or tray and intermediate the type-bars and upon the ribs thereof, means for holding the spacing-bars within the box or tray, and spring detents carried by the undersides of the bars and adapted to yieldingly engage the notches of the type-bars, a vertically moving platen mounted to reciprocate below the opening in the box or tray, and means for operating the same whereby to contact with those type of the type-bars immediately above the opening in the box or tray.

5. In a machine of the class described, the combination with a type-bar supporting box or tray having an opening in its bottom and having its front wall flanged rearwardly to form a locking-flange, of a plurality of type-bars mounted to reciprocate in said box or tray whereby to successively bring their type opposite said opening, each of said bars having a longitudinally disposed rib or flange at one side, a plurality of spacing-bars also located in said box or tray and upon the ribs of the type-bars, each spacing-bar having its front end laterally bent to engage under said locking-flange, a reciprocating platen, and means for moving the same into and out of contact with the exposed type of the type-bars.

6. In a machine of the class described, the combination with a type-bar supporting box or tray having an opening in its bottom and having its front wall flanged rearwardly to form a locking-flange, of a plurality of type-bars mounted to reciprocate in said box or tray, whereby to successively bring their type opposite said opening, each of said bars having a longitudinally disposed lateral rib or flange provided on its upper side with a plurality of shallow notches, one for each type of the type-bar, a plurality of spacing-bars also located in said box or tray intermediate the type-bars and upon the ribs thereof, each spacing-bar having its front end laterally bent to engage under said locking-flange, a spring detent carried by each of the spacing-bars and adapted to successively engage the notches of the adjacent type-bar, a vertically reciprocating platen, and means for raising and lowering the same into and out of contact with the type of the type-bars.

7. In a machine of the class described, the combination with an oblong type box or tray having a transverse opening in its bottom and its front wall rearwardly bent to form a locking flange, and a cover extending from its back end to a point short of its front, whereby to form an exposed portion, of a plurality of type-bars slightly longer than the exposed portion of and mounted for reciprocation in the box or tray, each of the type-bars having at one side a longitudinally disposed rib having notches, one for each type carried by the type-bar, a plurality of spacing-bars mounted intermediate the type-bars and upon the ribs thereof and having their front ends laterally bent to engage under the locking-flange of the box or tray, spring detents carried by the spacing-bars adapted to engage the notches of the ribs of the type-bars, a vertically movable platen below the opening in the box or tray, and means for raising and lowering the platen into and out of contact with the type of the type-bars coincident with the opening in the box or tray.

8. In a machine of the class described, the combination with a body of type, and a reciprocating platen arranged in line therewith, of an operating lever, means connecting the same with the platen whereby to operate the latter into and out of contact with the body of type, a movable inker intermediate the body of type and platen, a secondary lever fulcrumed on the operating lever, and having a limited movement independent of the operating lever, and means connecting the secondary lever with the inker, whereby the latter is operated prior to the movement of the operating lever.

9. In a machine of the class described, the combination with a body of type and a reciprocating platen arranged in line therewith, of an operating lever, means connecting the same with the platen whereby to operate the latter into and out of contact with the body of type, an inker swingingly suspended intermediate the body of type and platen, a secondary lever fulcrumed on the operating lever and having a limited movement independent of the same, and means connecting the secondary lever with the inker whereby the latter is moved into contact with the body of type and away from and out of the path of the platen where it is held prior to and during the movement of the operating lever and platen.

10. In a machine of the class described, the combination with a body of type and a reciprocating platen arranged in line therewith, of an operating lever, means connecting the same with the platen whereby to operate the latter into and out of contact with the body of type, the upper end of said lever being recessed, a movable inker swingingly supported between the body of type and the platen, a secondary lever fulcrumed in the recess of the operating lever, stops for limiting the movement of the secondary lever independent of the operating lever, and means connecting the secondary lever with the inker whereby the latter, upon the operation of the secondary lever, is swung into contact with the body of type.

11. In a machine of the class described, the combination with a body of type and a reciprocating platen arranged in line therewith, of an operating lever, means connecting the same with the platen, whereby to operate the latter into and out of contact with the body of type, an inker swingingly suspended intermediate the body of type and platen, a secondary lever fulcrumed on the operating lever and having a limited movement independent of the same, a spring for yieldingly holding the secondary lever in its inoperative position, and means connecting the secondary lever with the inker, whereby the latter is moved into contact with the body of type and away from and out of the path of the platen where it is held prior to and during the movement of the operating lever and platen.

12. In a machine of the class described, the combination with a body of type and a reciprocating platen arranged in line therewith, of an operating lever, means connecting the same with the platen whereby to operate the latter into and out of contact with the body of type, an inker swingingly suspended intermediate the body of type and platen, a secondary lever fulcrumed on the operating lever and having a limited movement independent of the same, means connecting the secondary lever with the inker, whereby the latter is moved into and out of contact with the body of type and out of the path of the platen, and means for rigidly holding the operating lever against movement during the operation of depressing the secondary lever.

13. In a machine of the class described, the combination with a body of type and a reciprocating platen arranged in line therewith, of an operating lever, means connecting the same with the platen whereby to operate the latter into and out of contact with the body of type, an inker swingingly suspended intermediate the body of type and platen, a secondary lever fulcrumed on the operating lever and having a limited movement independent of the same, means connecting the secondary lever with the inker, whereby the latter is moved into and out of contact with the body of type and out of the path of the platen, and a spring of predetermined strength connected to the operating lever and adapted to hold the same against movement during the operation of the secondary lever for operating the inker.

14. In a machine of the class described, the combination with a body of type and a reciprocating platen arranged in line therewith, of a toggle-system connected to and adapted to operate the platen, an operating lever for the platen, a secondary lever fulcrumed upon the operating lever and having a movement independent of the same, to a given point, an inker swingingly suspended intermediate the type and platen, connections between the same and the secondary lever, whereby to operate the inker upon a depression of the secondary lever, and a pair of springs connecting the toggle-system to the frame, said springs being of sufficient strength to retain the operating lever against movement during the depressing operation of the secondary lever.

15. In a machine of the class described, the combination with a body of type, and a platen therebelow, of an ink-pad below the type, a pair of links pivoted at their upper ends to the frame above the type and at their lower ends to the opposite front ends of the pad, a pair of angle slotted links intermediately pivoted to the frame above the type and at their lower ends to the rear end of the pad, a pair of angular guide-plates slotted and located on the frame at the sides of the angular slotted links, a lever, a pin passing through the slots of the links and guide-plates, and a link connecting the said pin and the lever, whereby, when the lever is depressed the pin is caused to travel in the slots and swing the ink-pad forward and upward and subsequently rearward.

16. In a machine of the class described, the combination with a body of type, and a platen therebelow, of an ink-pad below the type, a pair of front links pivoted to the frame and at their lower ends to the front corners of the pad, a pair of rear angular links intermediately pivoted to the frame, having their upper ends angled and slotted and their lower ends pivoted to the rear corners of the pad, angular guide-plates, slotted, and located at the sides of the upper ends of the angular links, a main operating lever for the platen, springs of a predetermined strength for holding the same against movement, an independent secondary lever fulcrumed on the upper end of the operating lever and having a limited movement independent of the same, a spring for normally supporting the same in an elevated position, a cross-pin passing through the slots of the angular links and the guide-plates, and a link connecting the same and the said secondary lever.

In testimony whereof, I have signed my name to this specification in the presence of two subscribing witnesses.

WILLARD D. DOREMUS.

Witnesses:
ADDISON G. DU BOIS,
W. S. DUVALL.